United States Patent
Wang et al.

(10) Patent No.: US 8,351,955 B2
(45) Date of Patent: Jan. 8, 2013

(54) METHOD AND DEVICE FOR DETERMINING ANTENNA COOPERATION SET, METHOD AND DEVICE FOR DETERMINING BASE STATION COOPERATION SET

(75) Inventors: Qixing Wang, Beijing (CN); Dajie Jiang, Beijing (CN); Guangyi Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 13/142,144

(22) PCT Filed: Dec. 24, 2009

(86) PCT No.: PCT/CN2009/001549
§ 371 (c)(1),
(2), (4) Date: Jul. 28, 2011

(87) PCT Pub. No.: WO2010/072053
PCT Pub. Date: Jul. 1, 2010

(65) Prior Publication Data
US 2011/0281591 A1    Nov. 17, 2011

(30) Foreign Application Priority Data
Dec. 24, 2008  (CN) .......................... 2008 1 0240825

(51) Int. Cl.
*H04W 72/00* (2009.01)
(52) U.S. Cl. .................. 455/452.2; 455/450; 455/452.1; 455/464; 455/13.3; 455/24; 455/500; 455/513; 455/63.4; 370/335; 370/329; 370/334; 370/342; 370/339; 370/343; 370/365; 370/380; 370/242; 370/252
(58) Field of Classification Search ................... 455/450, 455/452.2, 452.1, 464, 13.3, 24, 500, 513, 455/63.4; 370/335, 329, 334, 342, 339, 343, 370/365, 380, 242, 252
See application file for complete search history.

(56) References Cited

U.S. PATENT DOCUMENTS
2003/0214917 A1 * 11/2003 Molisch et al. ............... 370/286
(Continued)

FOREIGN PATENT DOCUMENTS
CN       1878022     12/2006
CN     101257711      9/2008

OTHER PUBLICATIONS
PCT/CN2009/001549, Mail Date Apr. 1, 2010, International Search Report.

*Primary Examiner* — Kwasi Karikari
(74) *Attorney, Agent, or Firm* — Workman Nydegger (57) ABSTRACT

A method and device for determining an antenna cooperation set, and a method and device for determining a base station cooperation set in the mobile communication field are provided. The method includes that a signal joint processing system obtains the channel quality between a mobile terminal and at least two base stations, determines the base stations, which are corresponding to the channel quality higher than the channel quality threshold, as the cooperation base station set of the mobile terminal. Because the channel quality between the mobile terminal and the antenna of each base station is used to determine the cooperation antenna set dynamically, therefore, the determined cooperation antenna set includes the antennae that have very strong interference to the mobile terminal, or the antennae that have been strongly interfered by the mobile station. By performing signal joint processing to the antennae, signal interference among adjacent cells can be reduced, better accuracy for detecting mobile terminal signals can be obtained, the accuracy for receiving signals by the mobile station is improved, and namely the communication quality between the mobile terminal and the base stations is improved.

8 Claims, 5 Drawing Sheets

U.S. PATENT DOCUMENTS

2008/0013610 A1 1/2008 Varadarajan et al.
2008/0267108 A1* 10/2008 Zhang et al. .................. 370/312
2009/0042532 A1* 2/2009 Bienas et al. .................. 455/403
2009/0252099 A1* 10/2009 Black et al. ................... 370/329

* cited by examiner

Fig. 1

--Prior Art--

Fig. 2

--Prior Art--

METHOD AND DEVICE FOR DETERMINING ANTENNA COOPERATION SET, METHOD AND DEVICE FOR DETERMINING BASE STATION COOPERATION SET

Cross Reference to Related Applications

The present application is a US National Stage of International Application No. PCT/CN2009/001549, filed 24 Dec. 2009, designating the United States, and claiming priority to Chinese Patent Application No. 200810240825.5 filed 24 Dec. 2008.

FIELD OF THE INVENTION

The present invention relates to the field of mobile communications and particularly to inter-cell interference mitigation technologies.

BACKGROUND OF THE INVENTION

LTE-Advanced systems use Orthogonal Frequency Division Multiple Access (OFDMA) access mode. The interference among multiple users within the same cell can be avoided since users' information is carried on orthogonal different sub-carriers. But OFDMA access method itself does not have the ability to suppress inter-cell interference, thus the adjacent cell interference, i.e., inter-cell interference is the main aspect affecting the performance of the LTE-Advanced system. At the same time, in order to achieve higher spectrum efficiency, broadband mobile communication systems will be deployed with frequency reuse factor close to one. In a cellular system with networking at the same frequency, cell edge users will be interfered easier from adjacent cell, such interference severely limits cell edge user's service quality and throughput.

Figure 1:
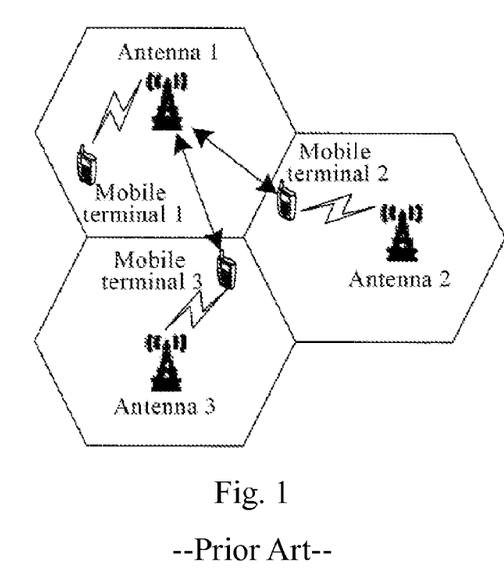
FIG. 1 illustrates a schematic diagram of an antenna of a Node B and a mobile terminal subject to signal interference of an adjacent cell in the prior art.

For example, as illustrated in FIG. 1, the antenna of mobile terminal 1's serving Node B is antenna 1, the antenna of mobile terminal 2's serving Node B is antenna 2, and the antenna of mobile terminal 3's serving Node B is antenna 3. Assume mobile terminals 1, 2 and 3 transmit signals respectively to the antennas 1, 2 and 3 at the same time and frequency (e.g., a frequency point A). Antenna 1's received signal at frequency point A includes the desired signal of mobile terminal 1 and the interference signals of mobile terminal 2 and mobile terminal 3, that is, the signal received by antenna 1 at frequency point A is a mixture of the signal transmitted from the mobile terminals 1, 2 and 3. Similarly, the interference signals of mobile terminal 1 and mobile terminal 3 are received by antenna 2 at the frequency point A in addition to the useful signal of mobile terminal 2, and the interference signals of mobile terminal 1 and mobile terminal 2 are received by antenna 3 at the frequency point A in addition to the useful signal of mobile terminal 3. That is, all the signals transmitted from mobile terminal 1, mobile terminal 2 and mobile terminal 3 can be received by antenna 1, antenna 2 and antenna 3.

On a downlink channel, mobile terminal 1 receives signals transmitted respectively from antenna 2 and antenna 3 to mobile terminals 2 and 3 in addition to a useful signal of antenna 1; Similarly, mobile terminal 2 receives signals transmitted respectively from antenna 1 and antenna 3 to mobile terminals 1 and 3 in addition to the useful signal of antenna 2, and mobile terminal 3 receives signals transmitted respectively from antenna 1 and antenna 2 to mobile terminals 1 and 2 in addition to the useful signal of antenna 3. That is, all the signals transmitted from antenna 1, antenna 2 and antenna 3 at the frequency point A can be received by mobile terminal 1, mobile terminal 2 and mobile terminal 3.

Figure 2:
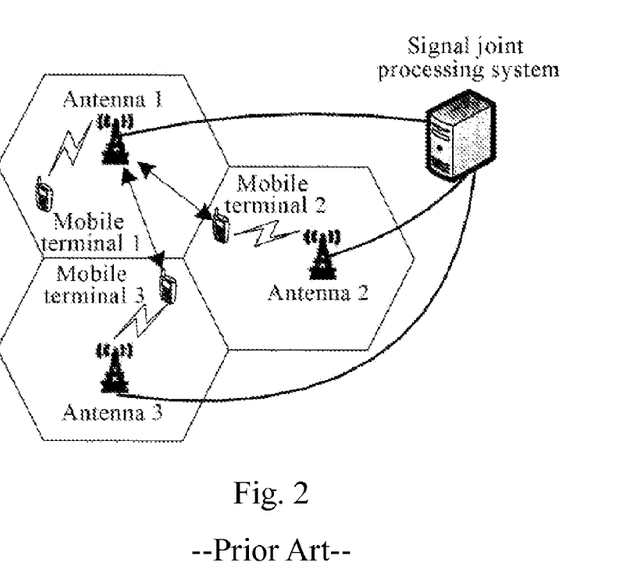
FIG. 2 illustrates a schematic diagram of a cooperative set of antennas in the prior art.

In order to alleviate such inter-cell signal interference, in the prior art, a cooperative set of antennas is consisted of antenna 1, antenna 2 and antenna 3 (as illustrated in FIG. 2), and a signal joint processing system performs a cooperative process on the signals received by the cooperative set of antennas from mobile terminals 1, 2 and 3 or transmitted by the cooperative set of antennas to the mobile terminals 1, 2 and 3 to improve a ratio of correctly detecting the signals of the mobile terminals by the antennas and a ratio of correct reception at the mobile terminals of the signals transmitted from the antennas.

In the prior art, the signal joint processing system of the cooperative set of antennas acquires information on channels between the respective antennas in the cooperative set of antennas and the mobile terminals (the channel information reflects qualities of the channels of communication between the antennas and the mobile terminals) and suppresses the interference signals of the mobile terminals in adjacent cells from the received signals through the technique of Multiple Input Multiple Output, MIMO.

The signal joint processing system acquires the signals received by antennas 1, 2 and 3 at the frequency point A and the information of the channels between antennas 1, 2 and 3 and mobile terminals 1, 2 and 3. The signal joint processing system suppresses the interference signals of the mobile terminals in the adjacent cells, by processing the received signals through MIMO, according to the acquired signals and channel information. So the system can detect the signals actually transmitted from mobile terminals 1, 2 and 3 (for example, the signals transmitted actually from the mobile terminals can be estimated in the following set 1 of equations):

$$\begin{cases} A1 \times X + B1 \times Y + C1 \times Z + n1 = P1 \\ A2 \times X + B2 \times Y + C2 \times Z + n2 = P2 \\ A3 \times X + B3 \times Y + C3 \times Z + n3 = P3 \end{cases} \quad (1)$$

Where P1, P2 and P3 represent the signals received by the antennas 1, 2 and 3 at the frequency point A respectively; A1, B1 and C1 represent the information on the channels between antenna 1 and the mobile terminals 1, 2 and 3 respectively; A2, B2 and C2 represent the information on the channels between antenna 2 and the mobile terminals 1, 2 and 3 respectively; A3, B3 and C3 represent the information on the channels between antenna 3 and the mobile terminals 1, 2 and 3 respectively; and n1, n2 and n3 represent noise and the interference signals of the other cells received by the antennas 1, 2 and 3 respectively; and the signals X, Y and Z transmitted actually from the mobile terminals 1, 2 and 3 can be estimated in the foregoing set 1 of equations.

Furthermore, a cooperative process on the signals transmitted to the mobile terminals is performed by the antennas in the cooperative set of antennas in order to improve the ratio of correct reception at the mobile terminals of the signals transmitted from the antennas when the signals are transmitted to the mobile terminals.

The signal joint processing system acquires data information to be transmitted to the mobile terminals 1, 2 and 3 and the information on the channels between the antennas 1, 2 and 3 and the mobile terminals 1, 2 and 3. According to the acquired data information and the channel information, the signal joint processing system weights the data information to be transmitted to the mobile terminals 1, 2 and 3 by using a beam forming algorithm to obtain transmission signals, which in turn are transmitted by the antennas 1, 2 and 3 at the frequency point A (for example, the signals transmitted by the antennas 1, 2 and 3 at the frequency point A can be derived in the following set 2 of equations):

$$\begin{cases} A2 \times R1 \times X + B2 \times R2 \times X + C2 \times R3 \times X = 0 \\ A3 \times R1 \times X + B3 \times R2 \times X + C3 \times R3 \times X = 0 \end{cases} \quad (2)$$

Where A1, B1 and C1 represent the information on the channels between the mobile 1 and the antennas 1, 2 and 3 respectively; A2, B2 and C2 represent the information on the channels between the mobile 2 and the antennas 1, 2 and 3 respectively; A3, B3 and C3 represent the information on the channels between the mobile 3 and the antennas 1, 2 and 3 respectively; and the foregoing equations can be solved into multiple sets of R1, R2 and R3, one of which is selected as weights for the data information to be transmitted respectively from antennas 1, 2 and 3 to mobile terminal 1. Similarly, weights R1', R2' and R3' for the data information to be transmitted respectively from the antennas 1, 2 and 3 to mobile terminal 2 and weights R1", R2" and R3" for the data information to be transmitted respectively from the antennas 1, 2 and 3 to mobile terminal 3 can be calculated. Thus, the signal transmitted from antenna 1 at the frequency point A is: R1×X+R1'×Y+R1"×Z; the signal transmitted from antenna 2 at the frequency point A is: R2×X+R2'×Y+R2"×Z; and the signal transmitted from antenna 3 at the frequency point A is: R3×X+R3'×Y+R3"×Z, where X, Y and Z represent the data information to be transmitted to the mobile terminals 1, 2 and 3 respectively.

Figure 3A:
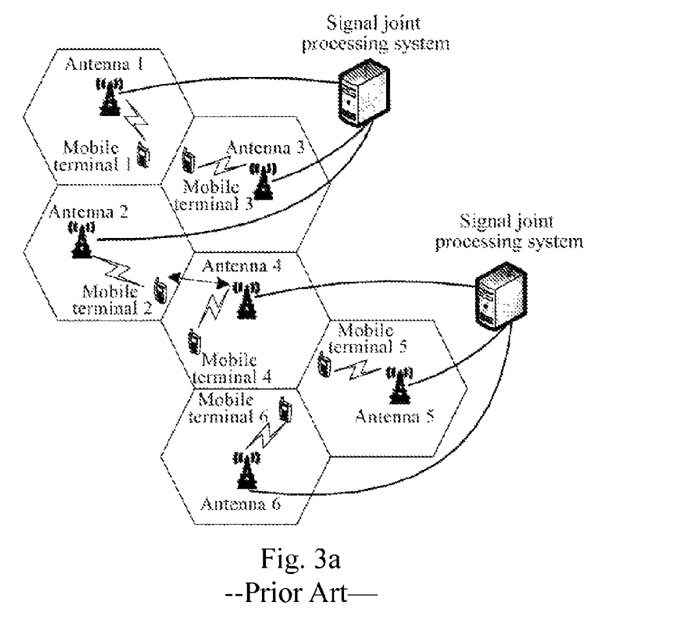
FIG. 3a and FIG. 3b illustrate schematic diagrams of a limited improvement to the quality of communication between a mobile terminal and an antenna with the cooperative set of antennas in the prior art.
Figure 3B:
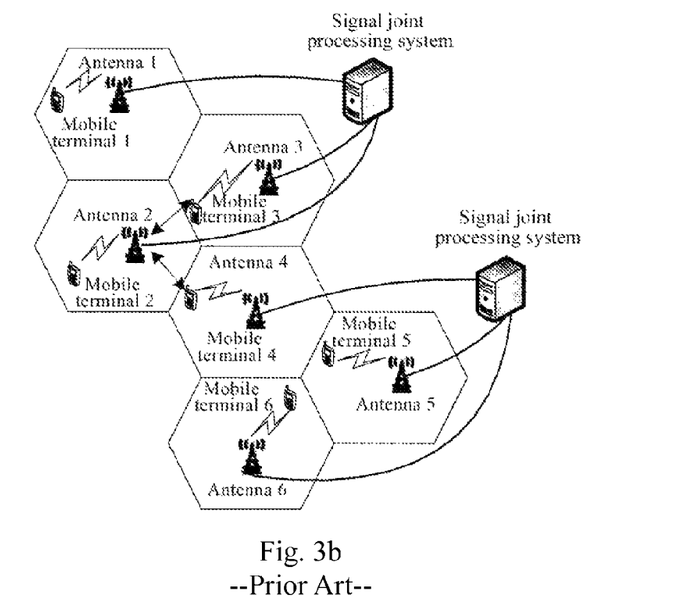

However, in the scenario illustrated in FIG. 3a, mobile terminal 2 receives a stronger interference signal from antenna 4 than from antenna 1. Therefore, there is an imperfect effect of suppressing the signal interference at mobile terminals at the edge of some cells (e.g., mobile terminal 2 in FIG. 3a) although the ratio of correct signal reception at mobile terminals at the edge of some other cells (e.g., mobile terminals 1 and 3 in FIG. 3a) can be improved by using the foregoing method with a cooperative set of antennas in the prior art; or in the scenario as illustrated in FIG. 3b, most of the interference signals in the signal transmitted from mobile terminal 2 and received by antenna 2 is from the mobile terminal 4 and mobile terminal 3 instead of mobile terminal 1 participating in calculation of signal interference in the prior art, therefore there is a limited effect of suppressing interference to the signal received and transmitted at mobile terminal 2 in the method of the prior art in the scenario as illustrated in FIG. 3b.

In conclusion, the method to suppress inter-cell signal interference in the prior art cannot always suppress interference to a signal communicated between a mobile terminal and an antenna in various practical situations effectively so that a quality of communication between the antenna of a Node B and some mobile terminals at the edge of a cell cannot be ensured at all time; and alike the existing method for suppressing inter-cell signal interference cannot always suppress interference to a signal communicated between a mobile terminal and a Node B in various practical situations effectively so that the quality of communication between the Node B and some mobile terminals at the edge of a cell can not be ensured at all time.

SUMMARY OF THE INVENTION

Embodiments of the invention provide a method and device for determining a cooperative set of antennas to improve a quality of communication between a mobile terminal and an antenna of a Node B and particularly between a mobile terminal at the edge of a cell and an antenna of a Node B.

Embodiments of the invention further provide a method and device for determining a cooperative set of Node Bs to improve a quality of communication between a mobile terminal and a Node B and particularly between a mobile terminal at the edge of a cell and a Node B.

A method for determining a cooperative set of antennas includes:

acquiring, by a signal joint processing system, qualities of channels between a mobile terminal and at least two antennas; and determining those of the antennas with a channel quality higher than a channel quality threshold to compose a cooperative set of antennas for the mobile terminal.

A device for determining a cooperative set of antennas includes:

a channel quality acquisition module configured to acquire qualities of channels between a mobile terminal and at least two antennas; and a cooperative set of antennas determination module configured to determine those of the antennas with a channel quality higher than a channel quality threshold to compose a cooperative set of antennas for the mobile terminal.

A method for determining a cooperative set of Node Bs includes:

acquiring, by a signal joint processing system, qualities of channels between a mobile terminal and at least two Node Bs; and determining those of the Node Bs with a channel quality higher than a channel quality threshold to compose a cooperative set of Node Bs for the mobile terminal.

A device for determining a cooperative set of Node Bs includes:

a channel quality acquisition module configured to acquire qualities of channels between a mobile terminal and at least two Node Bs; and a cooperative set of Node Bs determination module configured to determine those of the Node Bs with a channel quality higher than a channel quality threshold to compose a cooperative set of Node Bs for the mobile terminal.

According to the embodiments of the invention, a cooperative set of antennas is determined dynamically according to qualities of channels between a mobile terminal and antennas of respective Node Bs, therefore the determined cooperative set of antennas includes those of the antennas with strong interference to the mobile terminal (or those of the antennas subject to strong interference of the mobile terminal), and signal joint processing can be performed for these antennas, thereby achieving a higher ratio of correctly detecting a signal of the mobile terminal and improving a ratio of correction reception of a signal at the mobile terminal, i.e., improving a quality of communication between the mobile terminal and a Node B.

According to the embodiments of the invention, a cooperative set of Node Bs is determined dynamically according to qualities of channels between a mobile terminal and respective Node Bs, therefore the determined cooperative set of Node Bs includes those of the Node Bs with strong interference to the mobile terminal (or those of the Node Bs subject to strong interference of the mobile terminal), and signal joint processing can be performed for these Node Bs, thereby achieving a higher ratio of correctly detecting a signal of the mobile terminal and improving a ratio of correction reception of a signal at the mobile terminal, i.e., improving a quality of communication between the mobile terminal and a Node B.

DETAILED DESCRIPTION OF THE EMBODIMENTS

The inventors have identified that a predetermined cooperative set of antennas may not be appropriate for mobile terminals at the edge of some cell (e.g., mobile terminal 2 illustrated in FIG. 3a) although the quality of communication between mobile terminals at the edge of some other cells and an antenna can be improved in the method with a static predetermined cooperative set of antennas in the prior art, therefore this problem can be addressed in a method with a dynamic cooperative set of antennas. That is, a cooperative set of antennas can be composed for each of the mobile terminals dependent upon specific practical situation of the mobile terminal and used to improve the quality of communication between the mobile terminal and the antennas.

Furthermore, an embodiment of the invention further provides a method for dynamically determining a set of interfering mobile terminals for each of mobile terminals. The set of interfering mobile terminals for the mobile terminal includes those mobile terminals with strong interference to a signal of the mobile terminal, thus interference of the mobile terminals in the set of interfering mobile terminals can be suppressed to thereby improve the quality of communication between the mobile terminal and the antenna.

Figure 4:
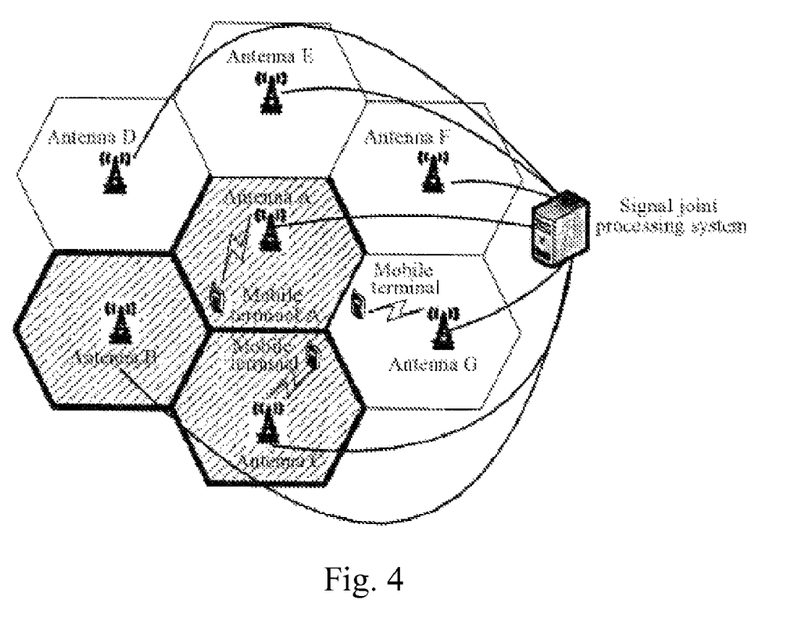
FIG. 4 illustrates a schematic diagram of determining a cooperative set of antennas according to an embodiment of the invention.
Figure 5:
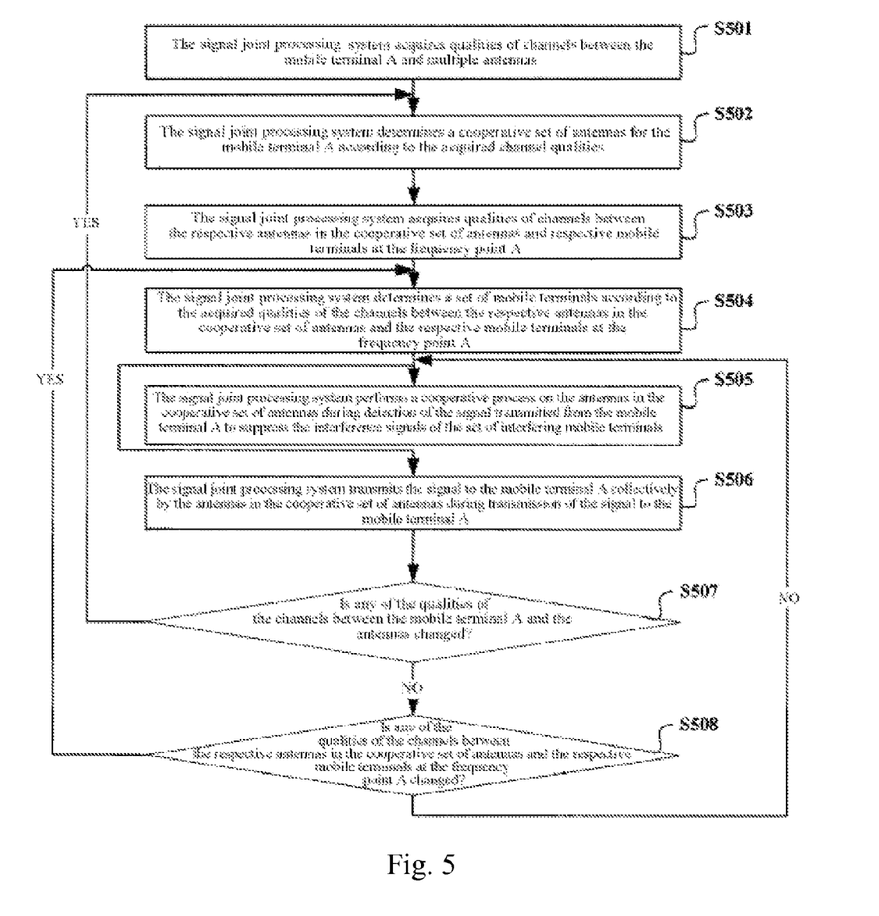
FIG. 5 illustrates a flow chart of a method for determining a cooperative set of antennas and detecting and transmitting a signal according to an embodiment of the invention.

In a system as illustrated in FIG. 4, for example, the flow chart of the method for determining a cooperative set of antennas and detecting and transmitting a signal at a signal joint processing system for a mobile terminal A as illustrated in FIG. 5 includes the following operations S501 to S508.

S501. The signal joint processing system acquires qualities of channels between the mobile terminal A and multiple antennas.

If the mobile terminal A communicates with an antenna of a Node B in a serving cell at a frequency point A to receive/transmit a signal, then the signal transmitted from the mobile terminal A may also be received by antennas of Node Bs in some adjacent cells at the frequency point A, or if signals are transmitted by these antennas at the frequency point A, then the mobile terminal A may receive their transmitted signals.

Qualities of channels between the mobile terminal A and these antennas (including at least two antennas), i.e., channel qualities, can be determined particularly as follows.

1) The mobile terminal A transmits an uplink pilot to these antennas, and the Node Bs detect pilot signals received by the respective antennas and determine the qualities of the channels between the mobile terminal A and the respective antennas, i.e., the channel qualities. For example, signal-to-noise ratios of the pilot signals received by the antennas are detected, and the qualities of the channels between the mobile terminal A and the respective antennas are reflected by magnitudes of the signal-to-noise ratios; or peaks of the pilot signals received by the antennas are detected, and the qualities of the channels between the mobile terminal A and the respective antennas are reflected by magnitudes of the peaks; or powers of the pilot signals received by the antennas are detected, and the qualities of the channels between the mobile terminal A and the respective antennas are reflected by magnitudes of the powers. Those skilled in the art may determine the qualities of the channels between the mobile terminal A and the respective antennas taking into account the practical condition. The Node Bs transmit the determined qualities of the channels between the mobile terminal A and the respective antennas to the signal joint processing system.

2) The Node Bs transmits a downlink pilot to the mobile terminal A by these antennas, the mobile terminal A detects and reports powers or signal-to-noise ratios or peaks of received pilot signals to the Node Bs, and the Node Bs determine the qualities of the channels between the mobile terminal A and the respective antennas according to the powers or the signal-to-noise ratios or the peaks of the pilot signals reported from the mobile terminal and transmit the determined qualities of the channels between the mobile terminal A and the respective antennas to the signal joint processing system.

S502. The signal joint processing system determines a cooperative set of antennas for the mobile terminal A according to the acquired channel qualities.

The signal joint processing system takes those of the antennas with a channel quality higher than a channel quality threshold A as antennas in a cooperative set of antennas for the mobile terminal A. The channel quality threshold A may be preset or calculated in the following method:

the signal joint processing system determines the highest one of the acquired channel qualities and takes the product of the highest channel quality and a preset percentage threshold (e.g., 70%) as the channel quality threshold A.

The signal joint processing system may detect and transmit a signal as in the prior art after determining the cooperative set of antennas for the mobile terminal A. That is to say, the cooperative set of antennas determined in the method according to the embodiment of the invention is taken as a predetermined cooperative set of antennas. For example, antennas A, B, and C are determined as the cooperative set of antennas for the mobile terminal A; and then, communication with the mobile terminal A is performed in the foregoing signal detection method and signal transmission method in the prior art. For example, during detection of a signal, the signal joint processing system acquires signals received by the respective antennas in the determined cooperative set of antennas for the mobile terminal A at the frequency point A and detects the signal of the mobile terminal according to acquired information on channels between the respective antennas in the cooperative set of antennas and mobile terminals served by the antennas at the frequency point A. During transmission of a signal to the mobile terminal, the signal joint processing system acquires data information to be transmitted to the mobile terminal A and determines the signals transmitted from the respective antennas in the cooperative set of antennas at the frequency point A according to the acquired information on the channels between the respective antennas in the cooperative set of antennas and the mobile terminals served by the antennas at the frequency point A.

Thus, the cooperative set of antennas can be determined dynamically while taking into account the antennas with strong interference to the mobile terminal to thereby effectively suppress signal interference.

Furthermore, communication between the mobile terminal A and an antenna can also be performed in a method for dynamically determining a set of mobile terminals according to an embodiment of the invention in order to achieve a better quality of communication.

S503. The signal joint processing system acquires qualities of channels between the respective antennas in the cooperative set of antennas and respective mobile terminals at the frequency point A.

For one of the antennas in the cooperative set of antennas (given antenna C), signals transmitted from mobile terminals in the current cell and adjacent cells may be received by antenna C at the frequency point A; similarly, the signal transmitted from antenna C at the frequency point A may be received at the mobile terminals in the current cell and adjacent cells. The signal joint processing system acquires qualities of channels between antenna C and these mobile terminals. The qualities of the channels between antenna C and these mobile terminals may be determined particularly as introduced in the operation S501, and a repeated description thereof will be omitted here.

S504. The signal joint processing system determines a set of mobile terminals according to the acquired qualities of the channels between the respective antennas in the cooperative set of antennas and the respective mobile terminals at the frequency point A.

After acquiring the qualities of the channels between the respective antennas in the cooperative set of antennas and the respective mobile terminals at the frequency point A, the signal joint processing system calculates for each of the mobile terminals the sum of the qualities of the channels between the mobile terminal and the respective antennas, compares the calculated sums of channel qualities of the respective mobile terminals with a channel quality threshold B and takes those of the mobile terminals with the sum of channel qualities higher than the channel quality threshold B as a member in the set of mobile terminals. The channel quality threshold B may be preset or the product of the highest one of the sums of channel qualities and a preset percentage threshold (e.g., 70%).

S505. The signal joint processing system performs a cooperative process on the antennas in the cooperative set of antennas during detection of the signal transmitted from the mobile terminal A to suppress the interference signals from the set of interfering mobile terminals.

The signal joint processing system acquires the signals received by the respective antennas in the cooperative set of antennas at the frequency point A and detects the signal of the mobile terminal A according to the acquired information on the channels between the respective antennas in the cooperative set of antennas and the respective mobile terminals in the set of mobile terminals. The signal of the mobile terminal A can be detected particularly through MIMO techniques available in the prior art, and a repeated description thereof will be omitted here.

S506. The signal joint processing system transmits the signal to the mobile terminal A collectively by the antennas in the cooperative set of antennas during transmission of the signal to the mobile terminal A.

The signal joint processing system acquires data information to be transmitted to the mobile terminal A and determines the signals transmitted from the respective antennas in the cooperative set of antennas at the frequency point A according to the acquired information on the channels between the respective antennas in the cooperative set of antennas and the respective mobile terminals in the set of mobile terminals. For details of determining the signals transmitted from the respective antennas in the cooperative set of antennas at the frequency point A, reference can be made to a beam forming algorithm available in the prior art, and a repeated description thereof will be omitted here.

The signal joint processing system notifies the Node Bs of the determined transmission signals, and the Node Bs control the antennas to transmit the transmission signals determined by the signal joint processing system. Thus, the interference signals arriving at the mobile terminal A can be suppressed.

S507. The qualities of the channels between the mobile terminal A and the antennas are updated periodically; and if any of the qualities of the channels is changed, then the cooperative set of antennas for the mobile terminal A and the set of mobile terminals are updated (that is, the operations S502-S504 are executed), and the signal is detected and transmitted according to the updated cooperative set of antennas and set of mobile terminals (that is, the operations S505 and S506 are executed); otherwise, the operation S508 is further executed.

For example, when the mobile terminal A in FIG. 4 moves closer to cells in which an antenna D and an antenna E are located, qualities of channels between the mobile terminal A and the antennas D and E are better than those between the mobile terminal A and antennas B and C, and then the signal joint processing system determines newly the cooperative set of antennas including the antenna A, the antenna D and the antenna E according to the newly acquired channel qualities and determines newly the set of mobile terminals according to the updated cooperative set of antennas in the foregoing method and further detects and transmits the signal (that is, the operations S505 and S506 are performed).

S508. The qualities of the channels between the respective antennas in the cooperative set of antennas and the respective mobile terminals at the frequency point A are further acquired periodically; and if any of the qualities of the channels is changed, then the set of mobile terminals for the mobile terminal A is updated (that is, the operation S504 is performed), and the signal is detected and transmitted according to the updated set of mobile terminals (that is, the operations S505 and S506 are performed); otherwise, the signal can be directly detected and transmitted (that is, the operations S505 and S506 are performed).

It shall be noted that the method for dynamically determining a set of mobile terminals can also be applied to a static cooperative set of antennas in the prior art. That is, a signal of a mobile terminal can be detected and transmitted after the method for dynamically determining a set of mobile terminals is adopted also for a predetermined cooperative set of antennas in the prior art. For example, if the antennas A, B and C of the Node Bs mentioned in the embodiment of the invention are members in a static cooperative set of antennas preset in the prior art, then a signal of a mobile terminal served by the antennas A, B and C of the Node Bs (e.g., the mobile terminal A) can be detected and transmitted after a set of mobile terminals is determined dynamically in the method of the operations S503-S506 for the mobile terminal. Since the determined set of mobile terminals includes those of the mobile terminals with strong interference to the mobile terminal A, signal interference can be suppressed more effectively for the set of interfering mobile terminals to thereby improve the quality of communication between the mobile terminal and the Node Bs.

As can be appreciated by those skilled in the art, it shall be noted that the operations of the method may not be performed in an exactly defined sequence although the operations have been described sequentially in the foregoing description to facilitate understanding thereof.

Figure 6:
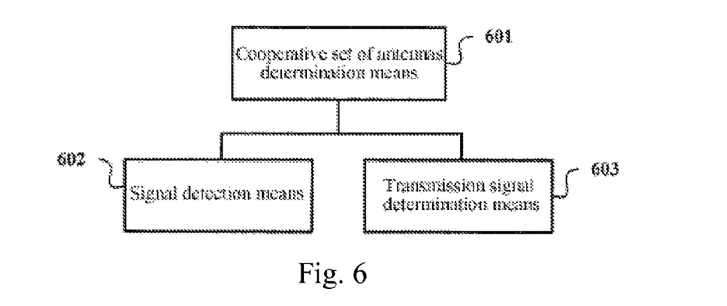
FIG. 6, FIG. 7 and FIG. 8 illustrate block diagrams of the structure of a signal joint processing system according to embodiments of the invention.
Figure 7:
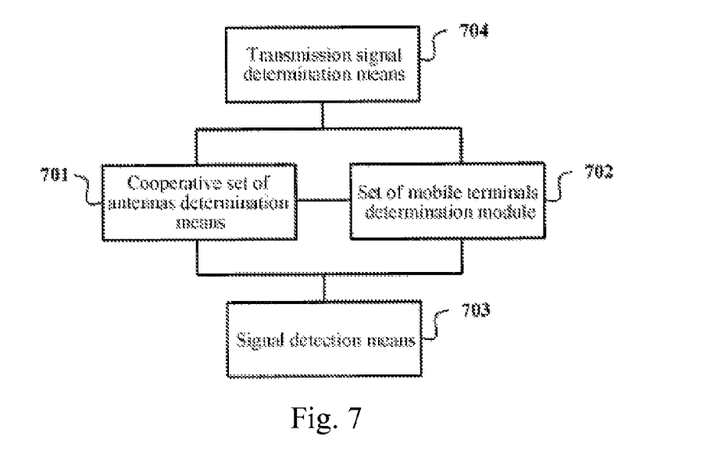
Figure 8:
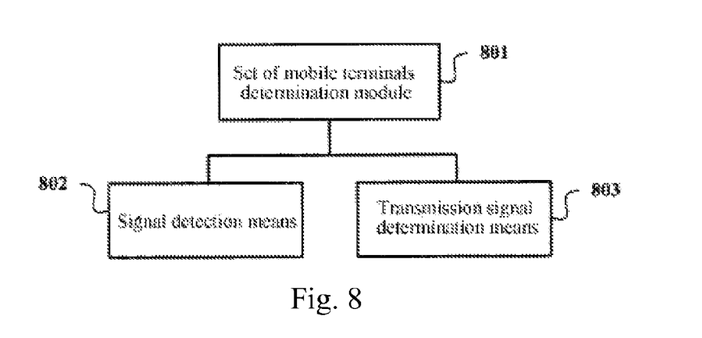

The signal joint processing system according to the foregoing method may be structured as illustrated in FIG. 6, FIG. 7 and FIG. 8, and the signal joint processing system illustrated in FIG. 6 includes cooperative set of antennas determination means 601 and signal detection means 602.

The cooperative set of antennas determination means 601 is configured to determine a cooperative set of antennas of a mobile terminal transmitting and receiving a signal at a frequency point A. Particularly, the cooperative set of antennas determination means 601 acquires qualities of channels between the mobile terminal and at least two antennas and determines those of the antennas with a channel quality higher than a channel quality threshold A to compose the cooperative set of antennas. The channel quality threshold A is determined as in the operation S502, and a repeated description thereof will be omitted here.

The signal detection means 602 is configured to acquire signals received by the respective antennas in the cooperative set of antennas at the frequency point A and to detect the signal of the mobile terminal according to acquired information on channels between the respective antennas in the cooperative set of antennas and mobile terminals served by the antennas at the frequency point A.

The signal joint processing system illustrated in FIG. 6 may further include transmission signal determination means 603.

The transmission signal determination means 603 acquires data information to be transmitted to the mobile terminal and determines signals transmitted from the respective antennas in the cooperative set of antennas at the frequency point A according to the acquired information on the channels between the respective antennas in the cooperative set of antennas and the mobile terminals served by the antennas at the frequency point A.

The signal joint processing system illustrated in FIG. 7 includes cooperative set of antennas determination means 701, a set of mobile terminals determination module 702 and signal detection means 703.

The cooperative set of antennas determination means 701 is configured to determine a cooperative set of antennas of a mobile terminal transmitting and receiving a signal at a frequency point A. Particularly, the cooperative set of antennas determination means 701 acquires qualities of channels between the mobile terminal and at least two antennas and determines those of the antennas with a channel quality higher than a channel quality threshold A to compose the cooperative set of antennas. The channel quality threshold A is determined as in the operation S502, and a repeated description thereof will be omitted here.

The set of mobile terminals determination module 702 is configured to determine a set of mobile terminals for the mobile terminal. Particularly, the set of mobile terminals determination module 702 acquires qualities of channels between the respective antennas in the cooperative set of antennas for the mobile terminal and respective mobile terminals at the frequency point A, determines for each of the mobile terminals the sum of the qualities of the channels between the mobile terminal and the respective antennas, compares the determined sums of channel qualities of the respective mobile terminals with a channel quality threshold B and takes those of the mobile terminals with the sum of channel qualities higher than the channel quality threshold B as a member in the set of mobile terminals. The channel quality threshold B may be preset or the product of the highest one of the sums of channel qualities and a preset percentage threshold (e.g., 70%).

The signal detection means 703 is configured to acquire signals received by the respective antennas in the cooperative set of antennas at the frequency point A and to detect the signal of the mobile terminal according to the acquired information on the channels between the respective antennas in the cooperative set of antennas and the respective mobile terminals in the set of mobile terminals.

The signal joint processing system illustrated in FIG. 7 further includes transmission signal determination means 704.

The transmission signal determination means 704 acquires data information to be transmitted to the mobile terminal and determines signals transmitted from the respective antennas in the cooperative set of antennas at the frequency point A according to the acquired information on the channels between the respective antennas in the cooperative set of antennas and the respective mobile terminals in the set of mobile terminals.

The signal joint processing system illustrated in FIG. 8 includes a set of mobile terminals determination module 801 and signal detection means 802.

The set of mobile terminals determination module 801 is configured to acquire qualities of channels between respective antennas in a cooperative set of antennas of a mobile terminal and respective mobile terminals at a frequency point A, then determine for each of the mobile terminals the sum of the qualities of the channels between the mobile terminal and the respective antennas, and compose a set of mobile terminals from those of the mobile terminals with the sum of channel qualities higher than a channel quality threshold;

The signal detection means 802 is configured to acquire signals received by the respective antennas in the cooperative set of antennas at the frequency point A and to detect a signal of the mobile terminal according to the acquired information on the channels between the respective antennas in the cooperative set of antennas and the respective mobile terminals in the set of mobile terminals.

The signal joint processing system illustrated in FIG. 8 further includes transmission signal determination means 803.

The transmission signal determination means 803 is configured to acquire data information to be transmitted to the mobile terminal and to determine signals transmitted from the respective antennas in the cooperative set of antennas at the frequency point A according to the acquired information on the channels between the respective antennas in the cooperative set of antennas and the respective mobile terminals in the set of mobile terminals.

The foregoing signal joint processing system (which may be a signal joint processing system illustrated in FIG. 6, FIG. 7 or FIG. 8) may be located in a separate server and connected with multiple Node Bs (e.g., a number of 20 to 30 Node Bs) to thereby acquire signals transmitted and received by antennas of these Node Bs and relevant information to suppress interference signals and improve a quality of communication between an antenna of a Node B and a mobile terminal; or the signal joint processing system may alternatively be integrated in a Node B which acquire signals transmitted and received by antennas of other Node Bs and relevant information from an interconnection network between the Node Bs to thereby suppress interference signals and improve a quality of communication between an antenna of a Node B and a mobile terminal.

According to the embodiments of the invention, a cooperative set of antennas is determined dynamically according to qualities of channels between a mobile terminal and antennas of respective Node Bs, therefore the determined cooperative set of antennas includes those of the antennas with strong interference to the mobile terminal (or those of the antennas strongly interfered by the mobile terminal). Interference suppressing aim at these antennas could achieve higher ratio of correct detection, i.e., improving the quality of communication between the mobile terminal and a Node B.

Since a set of mobile terminals is determined dynamically according to qualities of channels between the respective antennas in the cooperative set of antennas for the mobile terminal and respective mobile terminals at a specific frequency point, the determined set of mobile terminals includes those of the mobile terminals with strong interference to the mobile terminal. Interference suppressing aim at these mobile terminals with strong interference could achieve higher ratio of correct detection, i.e., improving the quality of communication between the mobile terminal and a Node B.

Figure 9:
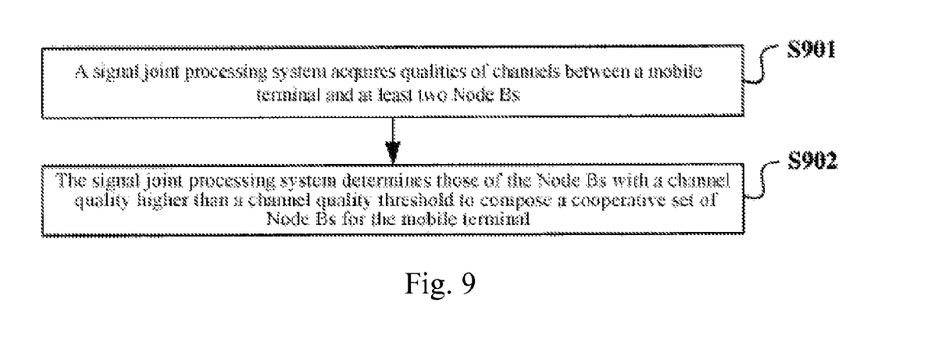
FIG. 9 illustrates a schematic flow chart of a method for determining a cooperative set of Node Bs according to an embodiment of the invention.

Furthermore, as illustrated in FIG. 9, a flow chart of a method for determining a cooperative set of Node Bs according to an embodiment of the invention, a specific processing flow thereof is as follows.

S901. A signal joint processing system acquires qualities of channels between a mobile terminal and at least two Node Bs;

The signal joint processing system may acquire qualities of channels between a mobile terminal and a Node B by using the following two methods.

1) The channel quality is particularly an uplink channel quality, and then the mobile terminal firstly transmits an uplink pilot to a Node B, the Node B detects the uplink pilot and determines the quality of an uplink channel between the mobile terminal and the Node B, and the signal joint processing system acquires the uplink channel quality from the Node B and takes the acquired uplink channel quality as the quality of the channel between the mobile terminal and the Node B.

2) The channel quality is particularly a downlink channel quality, and then the mobile terminal firstly detects a downlink pilot transmitted from a Node B, determines the quality of a downlink channel with the Node B and reports the downlink channel quality to the Node B. The signal joint processing system acquires the downlink channel quality from the Node B and takes the acquired downlink channel quality as the quality of the channel between the mobile terminal and the Node B.

S902. The signal joint processing system determines those of the Node Bs with the channel quality higher than the channel quality threshold to compose a cooperative set of Node Bs for the mobile terminal.

Particularly, the channel quality threshold may be a preset value or determined in the following method:

firstly, the signal joint processing system determines the highest one of the acquired channel qualities and takes the product of the highest channel quality and a preset percentage threshold as the channel quality threshold.

the method of mobile terminal signal's detection using the determined Node B cooperative set is the same as that using the determined antenna cooperative set which described above. Besides, the method of determining Node B's transmit signals using the determined Node B cooperative set is the same as the method of determining antennas' transmit signals using the determined antenna cooperative set which described above. Thus, a repeated description thereof will be omitted here.

In an embodiment of the invention, each Node B includes at least one antenna.

Correspondingly, an embodiment of the invention further provides a device for determining a cooperative set of Node Bs, which includes a channel quality acquisition module and a cooperative set of Node Bs determination module, where:

the channel quality acquisition module is configured to acquire qualities of channels between a mobile terminal and at least two Node Bs; and the cooperative set of Node Bs determination module is configured to determine those of the Node Bs with the channel quality higher than the channel quality threshold to compose a cooperative set of Node Bs for the mobile terminal.

Preferably, the cooperative set of Node Bs determination module includes:

a highest channel quality determination unit configured to determine the highest one of the channel qualities acquired by the channel quality acquisition module;

a channel quality threshold determination unit configured to take the product of the highest channel quality determined by the highest channel quality determination unit and a preset percentage threshold as the channel quality threshold; and a cooperative set of Node Bs determination unit configured to determine those of the Node Bs with the channel quality higher than the channel quality threshold determined by the channel quality threshold determination unit to compose the cooperative set of Node Bs for the mobile terminal.

Those ordinarily skilled in the art may appreciate all or part of the steps to achieve the above embodiments can be performed by program instructing relevant hardware, which can be stored in a computer readable storage medium, e.g., an ROM/RAM, a magnetic disk, an optical disk, etc.

As can be further appreciated, the structures of the devices illustrated in the drawings or the embodiments are merely schematic and represent logic structures. Modules illustrated as separate components may or may not be physically separate, and a component illustrated as a module may or may not be a physical module.

The foregoing description is merely illustrative of the preferred embodiments of the invention, and it shall be noted that those ordinarily skilled in the art can further make several modifications and variations without departing from the scope of the invention and that these modifications and variations shall also be constructed as coming into the scope of the invention.

The invention claimed is:

1. A method for determining a cooperative set of antennas, comprising:

acquiring, by a signal joint processing system, qualities of channels between a first mobile terminal and at least two antennas;

determining those of the antennas with a channel quality higher than a first channel quality threshold to compose a cooperative set of antennas for the first mobile terminal; and performing a cooperative process on signals transmitted between the cooperative set of antennas and the first mobile terminal, wherein the first channel quality threshold is a preset value; or the first channel quality threshold is determined as follows:

the signal joint processing system determines the highest one of the acquired channel qualities and takes the product of the highest channel quality and a preset percentage threshold as the first channel quality threshold.

2. A device for determining a cooperative set of antennas, comprising:
 a channel quality acquisition module configured to acquire qualities of channels between a first mobile terminal and at least two antennas;
 a cooperative set of antennas determination module configured to determine those of the antennas with a channel quality higher than a first channel quality threshold to compose a cooperative set of antennas for the first mobile terminal; and
 a module configured to perform a cooperative process on signals transmitted between the cooperative set of antennas and the first mobile terminal, wherein the cooperative set of antennas determination module comprises:
 a highest channel quality determination unit configured to determine the highest one of the channel qualities acquired by the channel quality acquisition module;
 a channel quality threshold determination unit configured to take the product of the highest channel quality determined by the highest channel quality determination unit and a preset percentage threshold as the first channel quality threshold; and
 a cooperative set of antennas determination unit configured to determine those of the antennas with a channel quality higher than the first channel quality threshold determined by the channel quality threshold determination unit to compose the cooperative set of antennas for the first mobile terminal.

3. A method for determining a cooperative set of Node Bs, comprising:
 acquiring, by a signal joint processing system, qualities of channels between a first mobile terminal and at least two Node Bs;
 determining those of the Node Bs with a channel quality higher than a first channel quality threshold to compose a cooperative set of Node Bs for the first mobile terminal; and
 performing a cooperative process on signals transmitted between the cooperative set of Node Bs and the first mobile terminal, wherein the first channel quality threshold is a preset value; or
 the first channel quality threshold is determined as follows:
 the signal joint processing system determines the highest one of the acquired channel qualities and takes the product of the highest channel quality and a preset percentage threshold as the first channel quality threshold.

4. A device for determining a cooperative set of Node Bs, comprising:
 a channel quality acquisition module configured to acquire qualities of channels between a first mobile terminal and at least two Node Bs;
 a cooperative set of Node Bs determination module configured to determine those of the Node Bs with a channel quality higher than a first channel quality threshold to compose a cooperative set of Node Bs for the first mobile terminal; and
 a module configured to perform a cooperative process on signals transmitted between the cooperative set of Node Bs and the first mobile terminal, wherein the cooperative set of Node Bs determination module comprises:
 a highest channel quality determination unit configured to determine the highest one of the channel qualities acquired by the channel quality acquisition module;
 a channel quality threshold determination unit configured to take the product of the highest channel quality determined by the highest channel quality determination unit and a preset percentage threshold as the first channel quality threshold; and
 a cooperative set of Node Bs determination unit configured to determine those of the Node Bs with a channel quality higher than the first channel quality threshold determined by the channel quality threshold determination unit to compose the cooperative set of Node Bs for the first mobile terminal.

5. A method for determining a cooperative set of antennas, comprising:
 acquiring, by a signal joint processing system, qualities of channels between a first mobile terminal and at least two antennas;
 determining those of the antennas with a channel quality higher than a first channel quality threshold to compose a cooperative set of antennas for the first mobile terminal;
 performing a cooperative process on signals transmitted between the cooperative set of antennas and the first mobile terminal;
 acquiring, by the signal joint processing system, qualities of channels between the respective antennas in the cooperative set of antennas and respective interfering mobile terminals at a frequency point, wherein, the first mobile terminal transmits or receives a signal at the frequency point;
 calculating, by the signal joint processing system, for each of the interfering mobile terminals a sum of the qualities of channels between the interfering mobile terminal and the respective antennas;
 determining those of the interfering mobile terminals with a sum of channel qualities higher than a second channel quality threshold to compose a cooperative set of interfering mobile terminals for the first mobile terminal; and
 performing, by the signal joint processing system, a cooperative process on the antennas in the cooperative set of antennas during detection of the signal transmitted from the first mobile terminal to suppress interference signals from the set of interfering mobile terminals.

6. A device for determining a cooperative set of antennas, comprising:
 a channel quality acquisition module configured to acquire qualities of channels between a first mobile terminal and at least two antennas;
 a cooperative set of antennas determination module configured to determine those of the antennas with a channel quality higher than a first channel quality threshold to compose a cooperative set of antennas for the first mobile terminal;
 a module configured to perform a cooperative process on signals transmitted between the cooperative set of antennas and the first mobile terminal;
 a set of mobile terminals determination module, configured to acquire qualities of channels between the respective antennas in the cooperative set of antennas and respective interfering mobile terminals at a frequency point, wherein, the first mobile terminal transmits or receives a signal at the frequency point; and configured to calculate for each of the interfering mobile terminals a sum of the qualities of channels between the interfering mobile terminal and the respective antennas; and configured to determine those of the interfering mobile terminals with a sum of channel qualities higher than a second channel quality threshold to compose a cooperative set of interfering mobile terminals for the first mobile terminal; and signal detection means, configured to perform a cooperative process on the antennas in the cooperative set of antennas during detection of the signal transmitted from the first mobile terminal to suppress interference signals from the set of interfering mobile terminals.

7. A method for determining a cooperative set of Node Bs, comprising:

acquiring, by a signal joint processing system, qualities of channels between a first mobile terminal and at least two Node Bs;

determining those of the Node Bs with a channel quality higher than a first channel quality threshold to compose a cooperative set of Node Bs for the first mobile terminal;

performing a cooperative process on signals transmitted between the cooperative set of Node Bs and the first mobile terminal;

acquiring, by the signal joint processing system, qualities of channels between the respective Node Bs in the cooperative set of Node Bs and respective interfering mobile terminals at a frequency point, wherein, the first mobile terminal transmits or receives a signal at the frequency point;

calculating, by the signal joint processing system, for each of the interfering mobile terminals a sum of the qualities of channels between the interfering mobile terminal and the respective Node Bs;

determining those of the interfering mobile terminals with a sum of channel qualities higher than a second channel quality threshold to compose a cooperative set of interfering mobile terminals for the first mobile terminal; and performing, by the signal joint processing system, a cooperative process on the Node Bs in the cooperative set of Node Bs during detection of the signal transmitted from the first mobile terminal to suppress interference signals from the set of interfering mobile terminals.

8. A device for determining a cooperative set of Node Bs, comprising:

a channel quality acquisition module configured to acquire qualities of channels between a first mobile terminal and at least two Node Bs;

a cooperative set of Node Bs determination module configured to determine those of the Node Bs with a channel quality higher than a first channel quality threshold to compose a cooperative set of Node Bs for the first mobile terminal;

a module configured to perform a cooperative process on signals transmitted between the cooperative set of Node Bs and the first mobile terminal;

a set of mobile terminals determination module, configured to acquire qualities of channels between the respective Node Bs in the cooperative set of Node Bs and respective interfering mobile terminals at a frequency point, wherein, the first mobile terminal transmits or receives a signal at the frequency point; and configured to calculate for each of the interfering mobile terminals a sum of the qualities of channels between the interfering mobile terminal and the respective Node Bs; and configured to determine those of the interfering mobile terminals with a sum of channel qualities higher than a second channel quality threshold to compose a cooperative set of interfering mobile terminals for the first mobile terminal; and signal detection means, configured to perform a cooperative process on the Node Bs in the cooperative set of Node Bs during detection of the signal transmitted from the first mobile terminal to suppress interference signals from the set of interfering mobile terminals.

\* \* \* \* \*